US012811116B2

(12) United States Patent
Malowney et al.

(10) Patent No.: US 12,811,116 B2
(45) Date of Patent: Nov. 24, 2026

(54) DRIFT TUBES

(71) Applicant: Decision Sciences International Corporation, Poway, CA (US)

(72) Inventors: Joshua Malowney, Poway, CA (US); Dustin Caldwell, San Diego, CA (US)

(73) Assignee: Decision Sciences International Corporation, Poway, CA (US)

( * ) Notice: Subject to any disclaimer, the term of this patent is extended or adjusted under 35 U.S.C. 154(b) by 233 days.

(21) Appl. No.: 18/590,320

(22) Filed: Feb. 28, 2024

(65) Prior Publication Data

US 2024/0213009 A1 Jun. 27, 2024

Related U.S. Application Data

(63) Continuation of application No. PCT/US2023/086079, filed on Dec. 27, 2023.

(60) Provisional application No. 63/435,481, filed on Dec. 27, 2022.

(51) Int. Cl.
*H01J 47/00* (2006.01)

(52) U.S. Cl.
CPC .................................. *H01J 47/008* (2013.01)

(58) Field of Classification Search
CPC ................................ H01J 47/008; G01T 1/18
USPC .......................................................... 250/286
See application file for complete search history.

(56) References Cited

U.S. PATENT DOCUMENTS

| | | | | |
|---|---|---|---|---|
| 3,784,860 | A * | 1/1974 | Cocks | H01J 47/08 313/278 |
| 8,288,721 | B2 | 10/2012 | Morris et al. | |
| 8,536,527 | B2 | 9/2013 | Wamba et al. | |
| 2014/0231664 | A1 | 8/2014 | Howe | |
| 2014/0367580 | A1* | 12/2014 | Rudd | B23K 9/0026 228/173.1 |

(Continued)

FOREIGN PATENT DOCUMENTS

| | | | |
|---|---|---|---|
| CN | 205539502 | U | 8/2016 |
| CN | 111922944 | A | 11/2020 |
| KR | 20170020732 | A | 2/2017 |

OTHER PUBLICATIONS

International Search Report and Written Opinion mailed May 10, 2024 in International Patent Application No. PCT/US23/86079, 24 pages.

(Continued)

*Primary Examiner* — Kiet T Nguyen
(74) *Attorney, Agent, or Firm* — Ashurst Perkins Coie US LLP

(57) ABSTRACT

Disclosed include a drift tube for particle detection, a detection system including one or more of the drift tubes, a method of producing a drift tube, and a detection method using a drift tube and/or a detection systems. The drift tube may include: a housing tube extending along a longitudinal axis and structured to include a first end, a second end, and an internal surface configured as a cathode, a first end cap and a second end cap hermetically engaged to and electrically isolated from the first end and the second end of the housing tube, respectively; a detection gas enclosed inside the housing tube and configured for undergo ionization by charged particles; and an anode wire traversing the housing tube along the longitudinal axis and being configured to detect the ionization that indicates a track of the charged particles inside the drift tube.

20 Claims, 12 Drawing Sheets

(56) References Cited

U.S. PATENT DOCUMENTS

| | | | | |
|---|---|---|---|---|
| 2015/0303044 | A1 | 10/2015 | Kaye et al. | |
| 2017/0357026 | A1 | 12/2017 | Gallagher et al. | |
| 2019/0341239 | A1 | 11/2019 | Schwed et al. | |
| 2022/0018979 | A1 * | 1/2022 | Baus | G01T 3/00 |
| 2023/0102216 | A1 * | 3/2023 | Schouten | G01T 1/18 250/358.1 |
| 2024/0063005 | A1 * | 2/2024 | Ghorbani | H01J 47/08 |

OTHER PUBLICATIONS

Office Action mailed Aug. 11, 2026 in Korean Patent Application No. 10-2025-7025055, 11 pages, English translation.

Wei, C., et al.: “Construction and testing of sMDT tubes at the University of Michigan for the ATLAS Muon Spectrometer upgrade”, Dept. of Physics, 2022, 17 pages.

* cited by examiner

SECTION A-A

Section E-E
Scale 3:1

Section F-F
Scale 3:1

DRIFT TUBES

PRIORITY CLAIM AND RELATED PATENT APPLICATION INFORMATION

This patent document is a bypass continuation of International Patent Application No. PCT/US23/86079, entitled “DRIFT TUBES” filed on Dec. 27, 2023, which claims the priority and benefits of U.S. Provisional Patent Application No. 63/435,481 entitled “DESIGN AND MANUFACTURING OF DRIFT TUBE END CAP AND APPLICATIONS OF RELATED DRIFT TUBES” filed on Dec. 27, 2022. The entire contents of the above applications are hereby incorporated by reference as part of the disclosure of this document.

TECHNICAL FIELD

This patent document relates to devices, systems, and methods for tomographic imaging and detection using ambient cosmic ray charged particles such as muons and electrons as a passive illuminating radiation source.

BACKGROUND

Cosmic ray tomography is a technique which exploits the multiple Coulomb scattering of highly penetrating cosmic ray-produced muons to perform non-destructive inspection of the material without the use of artificial radiation. The earth is continuously bombarded by energetic stable particles, mostly protons, coming from deep space. These particles interact with atoms in the upper atmosphere to produce showers of particles that include many short-lived ions which decay producing longer-lived muons. Muons interact with matter primarily through the Coulomb force having no nuclear interaction and radiating much less readily than electrons. Such cosmic ray-produced particles slowly lose energy through electromagnetic interactions. Consequently, many of the cosmic ray-produced muons arrive at the earth’s surface as highly penetrating charged radiation. The muon flux at sea level is about 1 muon per cm square per minute.

As a muon moves through material, Coulomb scattering off of the charges of sub-atomic particles perturb its trajectory. The total deflection depends on several material properties, but the dominant effect is the atomic number, Z, of nuclei. The trajectories of muons are more strongly affected by materials that make good gamma ray shielding, such as lead and tungsten, and by special nuclear materials (SNMs), such as uranium and plutonium, than by materials that make up more ordinary objects such as water, plastic, aluminum and steel. Each muon carries information about the objects that it has penetrated. The scattering of multiple muons can be measured and processed to probe the properties of these objects. A material with a high atomic number Z and a high density can be detected and identified when the material is located, inside low-Z and medium-Z matter.

In 2003, the scientists at Los Alamos National Laboratory developed a new imaging technique: muon scattering tomography (MT). With muon scattering tomography, both incoming and outgoing trajectories for each particle are reconstructed. The Los Alamos National Laboratory team built a muon tracker constructed from sealed cylindrical aluminum drift tubes, which were grouped into twenty-four 1.2-meter-square (4 ft.) planes. The drift tubes measure particle coordinates in X and Y with a typical accuracy of several hundred micrometers. Particle detector drift tubes such as those used in research facilities (e.g., European Council for Nuclear Research (CERN and the Femi National Accelerator Laboratory (Fermilab)) have also been constructed to detect a specified range of particles and particle energies for addressing a specific detection problem.

SUMMARY

This patent document discloses systems and methods for detection of charged particles such as muons using drift tube detectors.

One aspect of the present document relates to a drift tube. In some embodiments, the drift tube may include: a housing tube having a first end, a second end, and a longitudinal axis, and an internal surface extending along the longitudinal axis and configured as a cathode; a first end cap hermetically engaged to and electrically isolated from the first end of the housing tube; a second end cap hermetically engaged to and electrically isolated from the second end of the housing tube; a detection gas configured for undergo ionization by charged particles within the housing tube; and an anode wire having two wire terminals engaged to the first end cap and the second end cap, respectively, so that the anode wire traverses the housing tube along the longitudinal axis, the anode wire being configured to detect the ionization that indicates a track of the charged particles inside the drift tube.

Another aspect of the present document relates to a detection system. In some embodiments, the detection system may include: a plurality of drift tubes as in any one or more of the solutions disclosed herein; a mounting framework to hold the plurality of drift tubes in a predefined spatial arrangement; and a data acquisition system operably coupled to the plurality of drift tubes for collecting and processing data from the drift tubes.

A further aspect of the present document relates to a method of producing a drift tube. In some embodiments, the method may include: providing a housing tube, a first end cap, and a second end cap; placing an anode connector in an opening in each of the first end cap and the second end cap; forming an electrical separation between the respective anode connectors and the first end cap or the second end cap where the respective anode connectors are placed; inserting an anode wire through the housing tube, the first end cap, and the second end cap; coupling the first end cap and the second end cap to two ends of the housing tube; securing the anode wire at each of the first end cap and the second end cap; filling the housing tube with a detection gas; and hermetically sealing respective interfaces between the housing tube and the first end cap and the second end cap.

A still further aspect of the present document relates to a muon tomography system for detecting threat in an object, cargo, or vehicle under inspection. In some embodiments, the muon tomography system may include: a first set of position sensitive muon detectors located on a first side of an object holding area to measure positions and directions of incident muons towards the object holding area; a second set of position sensitive muon detectors located on a second side of the object holding area opposite to the first side to measure positions and directions of outgoing muons exiting the object holding area, wherein each of the first and second sets of position sensitive detectors is structured and arranged to allow at least three charged particle positional measurements in a first direction and at least three charged particle positional measurements in a second direction different from the first direction, and a signal processing unit to receive data of measured signals of the incoming muons from the first set of position sensitive muon detectors and measured signals of the outgoing muons from the second set of position sensitive muon detectors, the signal processing unit configured to analyze scattering behaviors of the muons caused by scattering of the muons in materials within the object holding area based on the measured incoming and outgoing positions and directions of muons to obtain a tomographic profile or a spatial distribution of scattering centers within the object holding area, and to generate an obtained cosmic muon image of the object, cargo, or vehicle under inspection, wherein each position sensitive muon detector includes at least one drift tube as in any one or more of the solutions disclosed herein.

A still further aspect of the present document relates to a muon tomography system for detecting threat in an object, cargo or vehicle under inspection using a detection system of any one or more of the embodiments disclosed herein.

A still further aspect of the present document relates to a method for sensing a volume exposed to charged particles. In some embodiments, the method may include: measuring energy loss of charged particles that enter and penetrate the volume and/or are stopped inside the volume without penetrating through the volume; based on the measured energy loss, determining a spatial distribution of the charged particles that enter and penetrate the volume or are stopped inside the volume without penetrating through the volume; using the spatial distribution of the energy loss of the charged particles to reconstruct the three-dimensional distribution of materials in the inspection volume; measuring charged particles that enter and penetrate through the volume and/or those that stop in the volume; and reconstructing a spatial distribution of one or more materials in the volume. The reconstruction may be achieved based on measurements of the energy loss of charged particles, angular deflection of charged particles, etc., or a combination thereof. In some embodiments, a first set of position sensitive detectors located on a first side of the volume may be configured to measure positions and directions of incident charged particles that penetrate the first set of position sensitive detectors to enter the volume. In some embodiments, a second set of position sensitive detectors located on a second side of the volume opposite to the first side may be configured to measure positions and directions of outgoing charged particles exiting the volume, or the lack thereof. This information acquired by the first set of position sensitive detectors and the second set of position sensitive detectors may be processed to determine energy loss of charged particles that enter and penetrate the volume and/or are stopped inside the volume without penetrating through the volume.

Those and other implementations are described in greater detail in the drawings, the description and the Claims.

DETAILED DESCRIPTION

Accurate operation of detector drift tubes is critical to the detection of muons. Drift tubes generally include a hermetically sealed gas filled tube with a cathode and an anode which conduct an electrical signal produced when the muons react with the gas inside the tube. Maintaining a secure seal to separate the gas from the surrounding atmosphere along with a good conductive metal for the anode is important for structure a drift tube in a desirable condition for accurate detection of charged particles.

Typically however, drift tubes are not designed for mobilized deployment or for withstanding extreme conditions of temperature, humidity and various weather conditions. Hence, in order to employ muon tomography in practical applications such as cargo inspection, spent nuclear fuel scanning, mining, infrastructure inspection and nuclear power fuel monitoring an improved drift tube detector is needed and the present subject matter addresses that need.

The disclosed technology and associated exemplary embodiments can be implemented in certain ways that enable a process to manufacture end caps of a drift tube for the detection and measurement of charged particles passing through the drift tube. The detection and measurement of the charged particles further enables a system to interpret the measurements for inspection of various objects of interest.

Figure 1A:
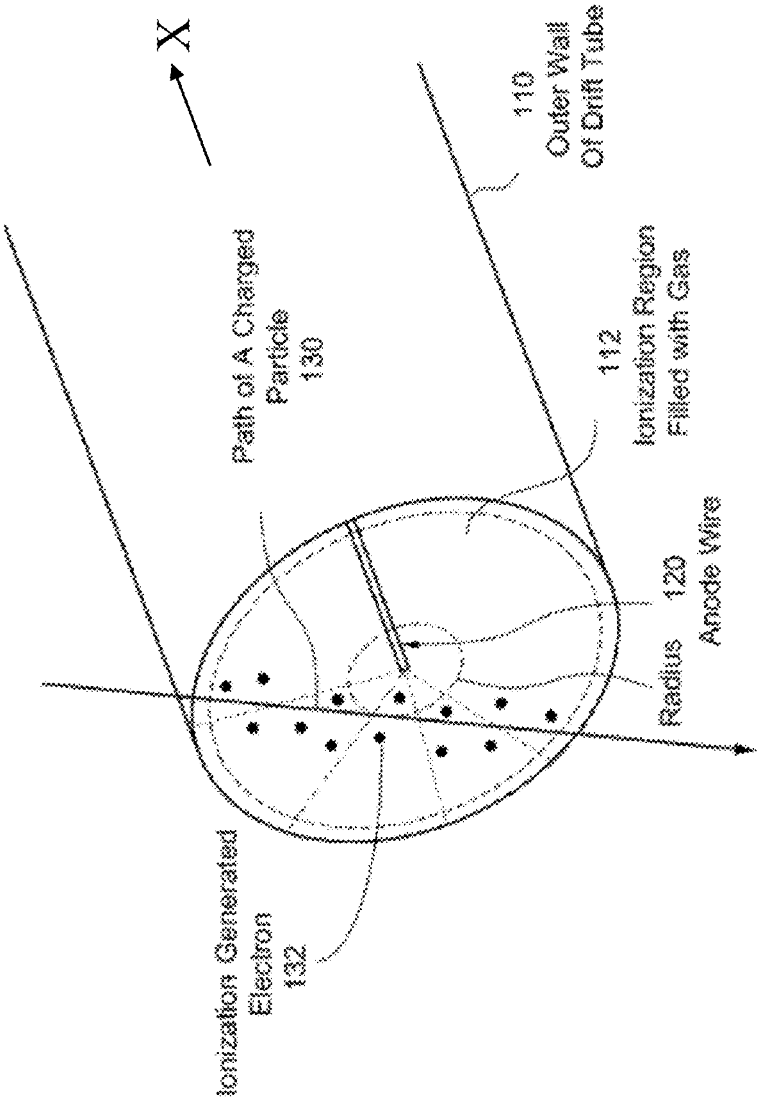
FIG. 1A shows an example of the basic common design features in different drift tube designs in accordance with some embodiments of the present document.

Drift tubes are gas chambers designed for detecting moving charged particles. FIG. 1A shows exemplary features in a drift tube. In this example, the drift tube includes a gaseous medium enclosed inside a chamber within the drift tube that can be ionized by a moving charged particle passing through the gaseous medium. An anode wire conductor is placed near the center of the drift tube and the wall of the drift tube is used as the cathode which is usually grounded to establish an electric field directed from the anode wire conductor towards the wall. An incoming charged particle ionizes the gas molecules of the gas medium to produce free electrons that are accelerated by the electric field towards the anode wire conductor. The drift time for such an electron to reach the anode wire conductor can be measured. Along the path of the incoming charged particle inside the drift tube, the drift times of electrons generated at different locations of the path of the charged particle are measured and are used to determine the track of the charged particle inside the drift tube.

One application for drift tubes is detection of charged particles (e.g., muons) by using one or more arrays of drift tubes. Examples of a muon tomography system using arrays of drift tubes are disclosed in the following published patent documents:

1. U.S. Pat. No. 8,536,527 B2 entitled "Imaging based on cosmic-ray produced charged particles," and
2. U.S. Pat. No. 8,288,721 B2 entitled "Imaging and sensing based on muon tomography."

The above patents are issued to Decision Sciences International Corporation and Los Alamos National Security LLC, the contents of which are incorporated as part of the specification of this patent document.

Features described in this application can be used to construct various muon tomography detection systems. For example, a muon tomography system can include an object holding area or volume for placing an object to be inspected, a first set of position sensitive muon detectors located on a first side of the object holding area to measure positions and directions of incident muons towards the object holding area, a second set of position sensitive muon detectors located on a second side of the object holding area opposite to the first side to measure positions and directions of outgoing muons exiting the object holding area, and a signal processing unit, which may include, e.g., a microprocessor, to receive data of measured signals of the incoming muons from the first set of position sensitive muon detectors and measured signals of the outgoing muons from the second set of position sensitive muon detectors. As an example, each of the first and second sets of particle detectors can be implemented to include drift tubes arranged to allow at least three charged particle positional measurements in a first direction and at least three charged particle positional measurements in a second direction different from the first direction. The signal processing unit is configured to analyze scattering behaviors of the muons caused by scattering of the muons in the materials within the object holding area based on the measured incoming and outgoing positions and directions of muons to obtain a tomographic profile or the spatial distribution of scattering centers within the object holding area. The obtained tomographic profile or the spatial distribution of scattering centers can be used to reveal the presence or absence of one or more objects in the object holding area such as materials with high atomic numbers including nuclear materials or devices. Each position sensitive muon detector can be implemented in various configurations, including drift cells such as drift tubes filled with a gas which can be ionized by muons. Such a system can be used to utilize natural cosmic ray-produced muons as the source of muons for detecting one or more objects in the object holding area.

Specifically, FIG. 1A illustrates operations of an exemplary drift tube for detecting charged particles. The drift tube in this example is a cylindrical tube formed by an outer cylindrical wall 110 and is filled with a detection gas such as Argon-Isobutane 230 to enable detection of the cosmic ray-produced charged particles, such as muons. An anode wire 120 extending along the length of the cylindrical tube along a longitudinal axis X. The anode wire 120 is configured to be electrically biased at a higher potential than the outer wall 110 to produce a positive voltage (e.g., 2-3 kV or higher) to generate a high-voltage static field inside the drift tube directing along radial directions from the anode wire 120 towards the wall 110 in an ionization region 112 inside the outer wall 110. When charged particles 130 enter the drift tube and interacts with gas atoms in the region 112, multiple electrons 132 may be liberated from those gas atoms. The static field causes the "string" of electrons to drift toward the positively charged anode wire 120. The anode wire 120 may be thin to create a high electric field near the anode wire 120, thereby producing an electron avalanche. The anode wire 120 is connected to a readout circuit and is read-out electronically with time-to-digital converters included as part the data acquisition electronics. As such, a hit signal is produced when a charged particle moves through the drift tube.

Figure 1B:
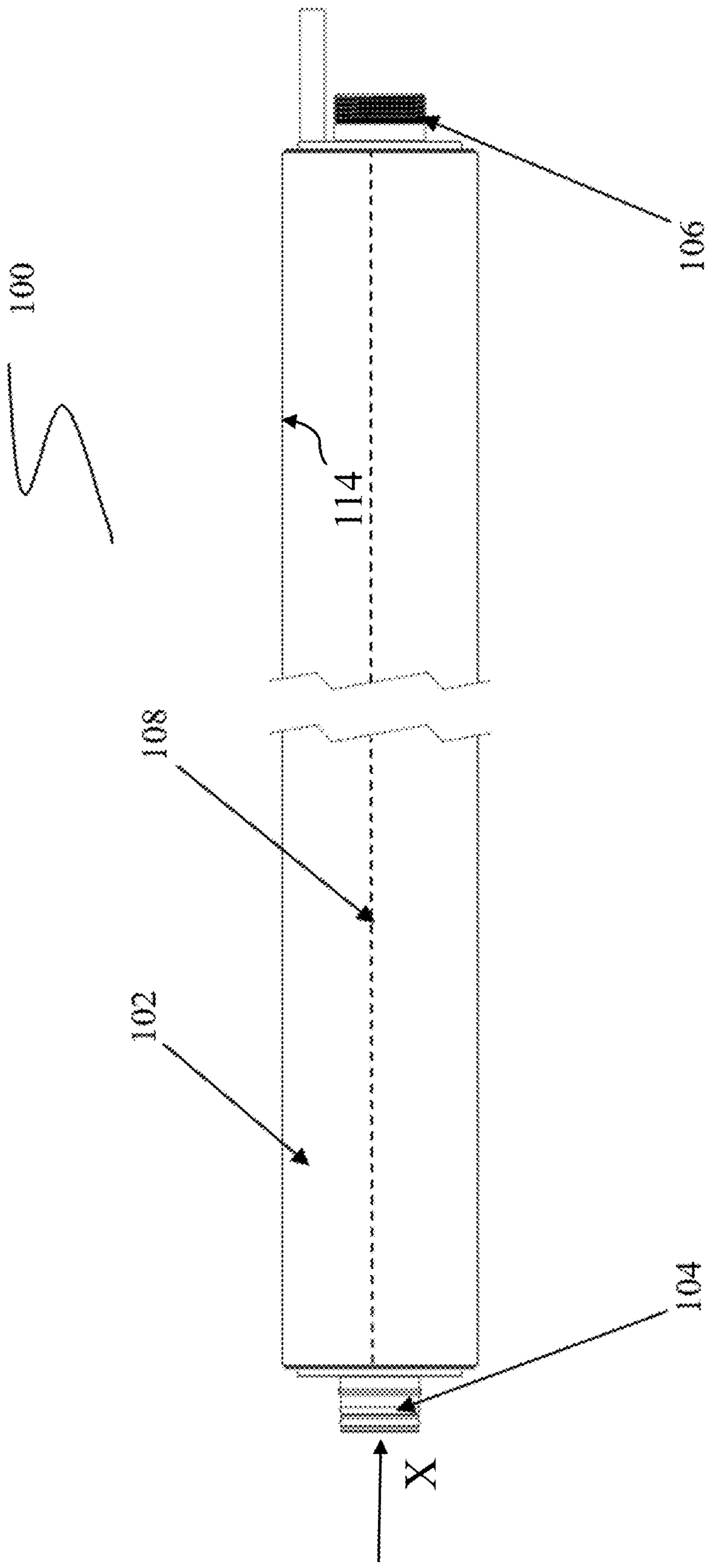
FIG. 1B illustrates an exemplary drift tube for implementing the basic drift tube design in FIG. 1A.

FIG. 1B illustrates an exemplary drift tube 100 for implementing the design in FIG. 1A. The drift tube 100 may include: a housing tube 102; a first end cap 104; a second end cap 106; a detection gas configured for undergo ionization by charged particles within the housing tube 102; and an anode wire 108 having two wire terminals engaged to the first end cap 104 and the second end cap 106, respectively. The anode wire 108 may traverse the housing tube 102 along the longitudinal axis X. The anode wire 108 may be configured to detect the ionization that indicates a track of the charged particles inside the drift tube 100.

The housing tube 102 may include a cylindrical tube of a desired length and the first and second end caps 104, 106 at each end of the housing tube 102 along the longitudinal axis X. The housing tube 102 may provide a structural frame of the drift tube 100. Depending on the application, the housing tube 102 may need to be resistant to various environmental factors like radiation, extreme temperatures, and/or corrosive substances. The material of the housing tube 102 may be selected based on one or more factors including strength, durability, and a non-magnetic property. The housing tube 102 may be made of at least one of stainless steel, aluminum, carbon fiber, etc. In various examples, the housing tube 102 may be implemented by using a reamed aluminum tube that has a center hollow channel that constitutes the region 112 as illustrated in FIG. 1A.

The housing tube 102 may be configured to allow penetration of incident particles, such as, e.g., muons. Charged particles may enter the drift tube 100 from the side wall of the housing tube 102. This allows the charged particles to traverse the length of the housing tube 102 along the longitudinal axis X, improving or maximizing the interaction with the detection gas inside. The impact of such charged particles passing through the side wall of the housing tube 102 on their trajectories and/or energy loss may be reduced or minimized by one or more measures. The housing tube 102 may be made from a material with a low atomic number (Z), such as aluminum to reduce or minimize scattering and/or absorption of the charged particles like muons. The side wall of the housing tube 102 may be thin to reduce or minimize interaction with the charged particles while maintaining structural integrity. For example, the wall thickness of the housing tube 102 may in the range of a few tenths of a millimeter (e.g., 0.1 mm to 0.5 mm), or from 0.5 mm to a few millimeters (up to about 2-3 mm) (e.g., where structural robustness is more critical). Besides the impact on particle interaction, the wall thickness may be selected based on one or more factors including the material of the housing tube 102, energy levels of the particles of interest (e.g., muons), environmental considerations (e.g., mechanical stress, temperature fluctuation, radiation, portability), etc.

The interaction of the side wall of the housing tube 102 with charged particles may be pre-determined by, e.g., experiments and/or numerical analysis (e.g., simulation) to understand and/or correct for systematic effects introduced by the wall material of the housing tube 102.

The cylindrical shape of the housing tube 102 may help create a substantially uniform electric field within the housing tube 102. The size (length and diameter) of the housing tube 102 can vary depending on the specific application. For example, a larger housing tube 102 (or the drift tube 100) can cover more area but may have lower spatial resolution, while a smaller housing tube 102 (or the drift tube 100) can provide higher precision. The length of the housing tube 102 may be in the range of a few centimeters (e.g., 10 cm to 30 cm) up to about a meter (100 cm).

The housing tube 102 may have an internal surface 114 facing the interior of the housing tube 102 and/or interfacing with the region 112. The internal surface 114 may oppose the anode wire 108. The internal surface 114 may extend along the longitudinal axis X and configured as a cathode. For example, the internal surface 114 of the housing tube 102 may be grounded. The internal surface 114 may be electrically conductive and substantially uniform to ensure a consistent electric field inside the housing tube 102. For example, the internal surface 114 may undergo a surface treatment to enhance its electrical properties, reduce outgassing in vacuum conditions, and/or to minimize background noise in the detector signal.

The housing tube 102 may be designed to allow for the integration of the anode wire 108, gas filling systems, electrical connections, and/or mounting systems. This often involves ports, feedthroughs for electrical connections, and mounting brackets.

The housing tube 102 may be airtight to contain a detection gas to allow for an ionization process that detects passing charged particles. This may take precision in manufacturing to ensure a good seal and/or to maintain the correct gas pressure inside the tube. In some embodiments, the first end cap 104 and the second end cap 106 may be hermetically engaged to and electrically isolated from the first end of the housing tube 102, respectively. The end caps 104 and 106 may be constructed from a material that is resistant to radiation and thermal variations, such as stainless steel, aluminum, a radiation-hardened polymer, etc. In some embodiments, the end caps 104 and 106 may be identical. In some embodiments, one end cap may be a male end cap 104 and the other end cap a female end cap 106 such that a plurality of drift tubes 100 may be connected end to end with the male end cap 104 of a drift tube 100 mating with the female end cap 106 of a neighboring drift tube 100 to configure a module of drift tubes 100. Additional description regarding the first end cap 104 and the second end cap 106 may be found elsewhere in the present document. See, e.g., FIGS. 1C-8D and relevant description thereof.

The detection gas may include a noble gas, e.g., argon. In some embodiments, the detection gas may include a mixture of a noble gas and a quencher gas. Examples of such quencher gas may include carbon dioxide or methane. Such a quencher gas may include an organic compound like methane ($CH_4$), ethane ($C_2H_6$), and carbon dioxide ($CO_2$), based on their ability to effectively absorb energy and prevent secondary ionizations, as well as their chemical and physical compatibility with the noble gas used. This detection gas may be ionized by the passing charged particles, resulting in electron-ion pairs. By using the mixture, the noble gas (like argon) may be primarily responsible for this ionization. However, without a quencher gas, the electrons can gain enough energy from the electric field to cause further ionization themselves, leading to a runaway effect known as a Townsend discharge. By including the quencher gas, the quencher gas may absorb some of the energy of these electrons, preventing them from causing additional ionization, thereby avoiding the development of an uncontrolled amplification cascade. By limiting secondary ionization, the quencher gas may ensure that the drift tube 100's response to a charged particle is proportional and consistent. The quencher gas may help in reducing the background noise in the drift tube 100 or a detection system (e.g., system 900) including thereof, improving the signal-to-noise ratio and the overall sensitivity of the detection system. Continuous or excessive gas amplification can damage the drift tube 100, e.g., the anode wire 108. The quench gas reduces this risk by mitigating the energy of the electrons. Over time, the detection gas in the drift tube 100 can degrade due to ionization and the resultant chemical reactions. The quencher gas may help in slowing down this degradation process. The quencher gas can influence the drift velocity of the electrons, leading to faster and more uniform drift times, which is beneficial for the drift tube 100 that needs high time resolution.

The anode wire 108 may serve as the anode. The anode wire 108 may traverse the length of the housing tube 102 and be tightly connected to the end caps 104, 106 on each end of the housing tube 102. The first end cap 104 and the second end cap 106 may include a first anode connector and a second anode connector electrically connected to one of the two wire terminals, respectively. Examples of the first and/or second anode connectors include 612 in FIG. 1C, 602 in FIG. 1D, 312 in FIGS. 4 and 7, 812 in FIG. 8B, and 822 in FIG. 8D. The first anode connector may be electrically isolated from the first end cap 104 using an electrically insulating material. The second anode connector may be electrically isolated from the second end cap 106 using an electrically insulating material. Examples of applicable electrically insulating material include at least one of glass or epoxy. The anode wire 108 may be positioned substantially centrally along the longitudinal axis X of the housing tube 102. One or each of the first end cap 104 and the second end cap 106 may include a tensioning mechanism 626 configured to tension the anode wire 108. The tensioning mechanism 626 may be configured to be adjustable to main a predetermined tension on the anode wire 108. For example, the tensioning mechanism 626 includes a spring-loaded assembly configured to compensate for thermal expansion and contraction of the anode wire 108. In some embodiments, at least one of the end caps 104 and 106 may include an integrated electrical feedthrough for connecting the anode wire 108 to an external power source and signal processing electronics.

The anode wire 108 may be produced using one or more of a variety of conductive metals enabled to receive electrons produced by the reaction of the detection gas with muons that enter the drift tube 100 from the upper atmosphere. The anode wire 108 may be made from a variety of materials including, e.g., copper, aluminum, tungsten (e.g., gold-plated tungsten), stainless steel, graphite, or the like, or an alloy thereof, or a combination thereof. The anode wire 108 may, for example, be a tungsten alloy or an alloy of other metals. The anode wire 108 is further enabled to conduct electrons through the length of the anode wire 108 which may be connected to a connector anode (not shown) from which instruments may be connected to receive signals from the anode wire 108. One end cap 106 may further include a fill tube 420 (see FIGS. 6 and 7) through which the gas enters the housing tube 102. The gas completely occupies the housing tube 102 expelling any atmospheric gas previously present in the housing tube 102. The gas is filled to a neutral pressure. The fill tube 420 may be sealed, e.g., being crimped, after the detection gas fills the housing tube 102 to seal the gas inside the exemplary drift tube 100. The exemplary drift tube 100 can then be assembled with a group of similar drift tubes to detect and measure the charge particles for further interpretation and analysis.

Single Uniform End Cap

Figure 1D:
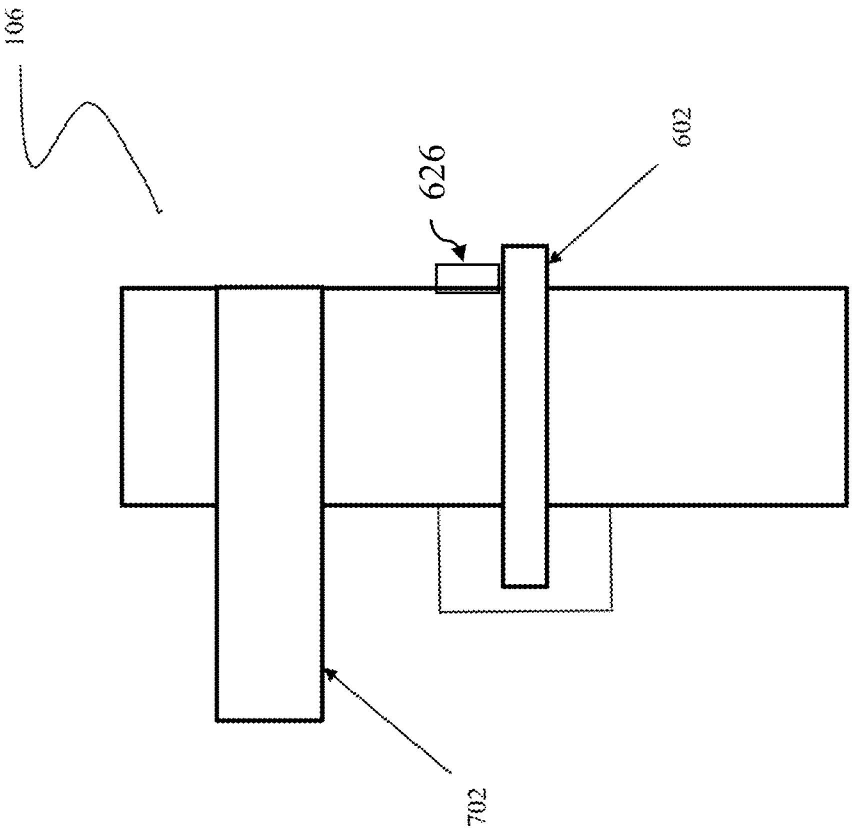
FIGS. 1C and 1D illustrate end caps in accordance with some embodiments of the present document.
Figure 1C:
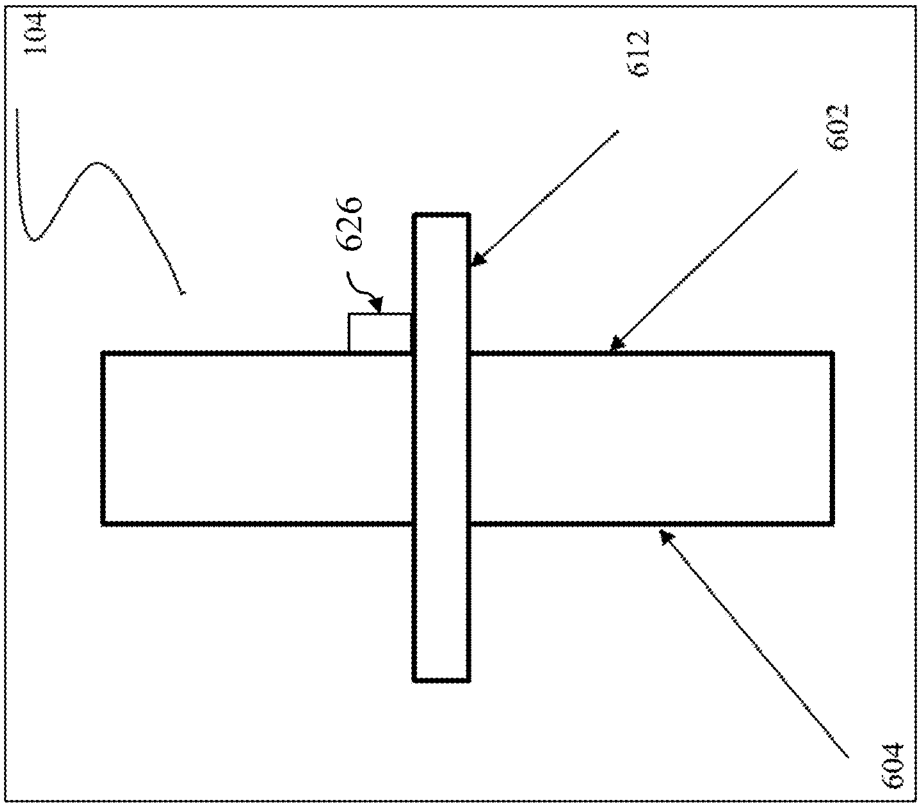

Referring to FIG. 1C, in one exemplary embodiment of an end cap 104, for example is circular in shape with a first side 602 and a second side 604 and may, for example be constructed from aluminum. The end cap 104 may be any shape and is described herein as circular for simplicity. The first side 602 is on an inner surface of the end cap 104 facing the inner volume of the housing tube 102. The first end 602 is enabled to mate tightly with an inner wall of the reamed housing tube 102 to create a leak proof seal when the end cap 104 and the housing tube 102 are mated and may be further fastened and sealed through various methods including welding, gluing and other methods to prevent any escape of the gas. The surface of the first end 602 may be within the housing tube 102 upon mating.

The exemplary end cap 104 includes an anode connector 612 which extends through the end cap 104 from the first side 602 to the second side 604. The anode connector 612 may include a seal (not shown) on the exterior side of the anode connector 612 facing an internal opening of the end cap 104. The seal may be established by molding the anode connector 612 within the end cap 104 during manufacturing or a seal may be created after inserting the anode connector 612 into the end cap 104 using an appropriate sealant. For example, an epoxy seal that is able to respond to temperature variations may be used.

Referring now to FIG. 1D, the exemplary end cap described with respect to FIG. 1C may further include a fill tube 702 in the end cap 106 for example. The fill cap may be made of various materials that allow access to the inner volume of the housing tube 102. For example, plastic or metal. In one embodiment a copper alloy may be used. The fill tube 702 extends through the end cap 106 and may be sealed with various appropriate sealants. For example, an epoxy seal may be used that can respond to temperature variations while maintaining complete seal. In some embodiments, both end caps 104 and 106 may include a fill tube 702 or an end cap 104, 106 may include two fill tubes 702.

Male and Female End Cap Variation

Figure 3:
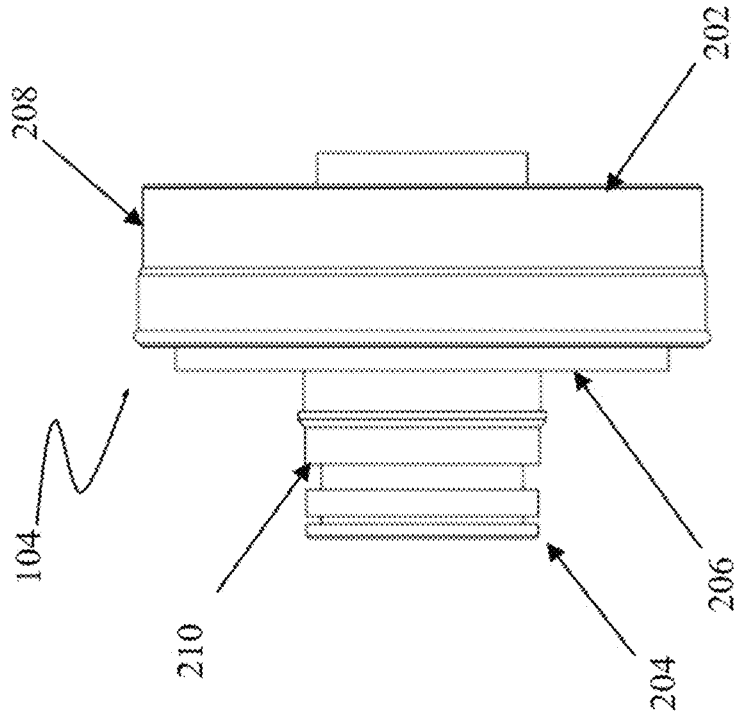
FIG. 3 illustrates a side view of a male drift tube end cap in accordance with some embodiments of the present document.
Figure 2:
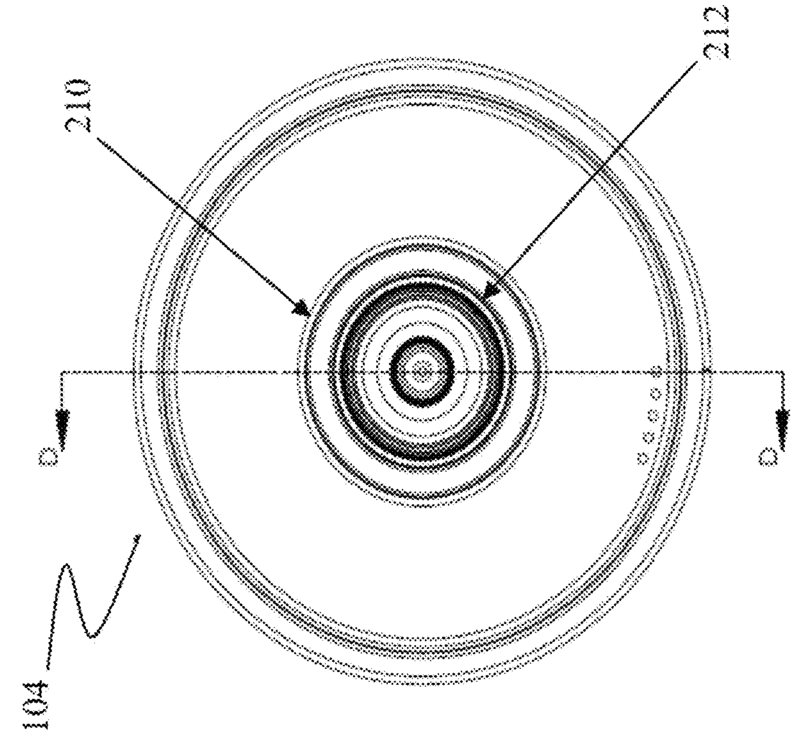
FIG. 2 illustrates a plan view of a male drift tube end cap in accordance with some embodiments of the present document.
Figure 4:
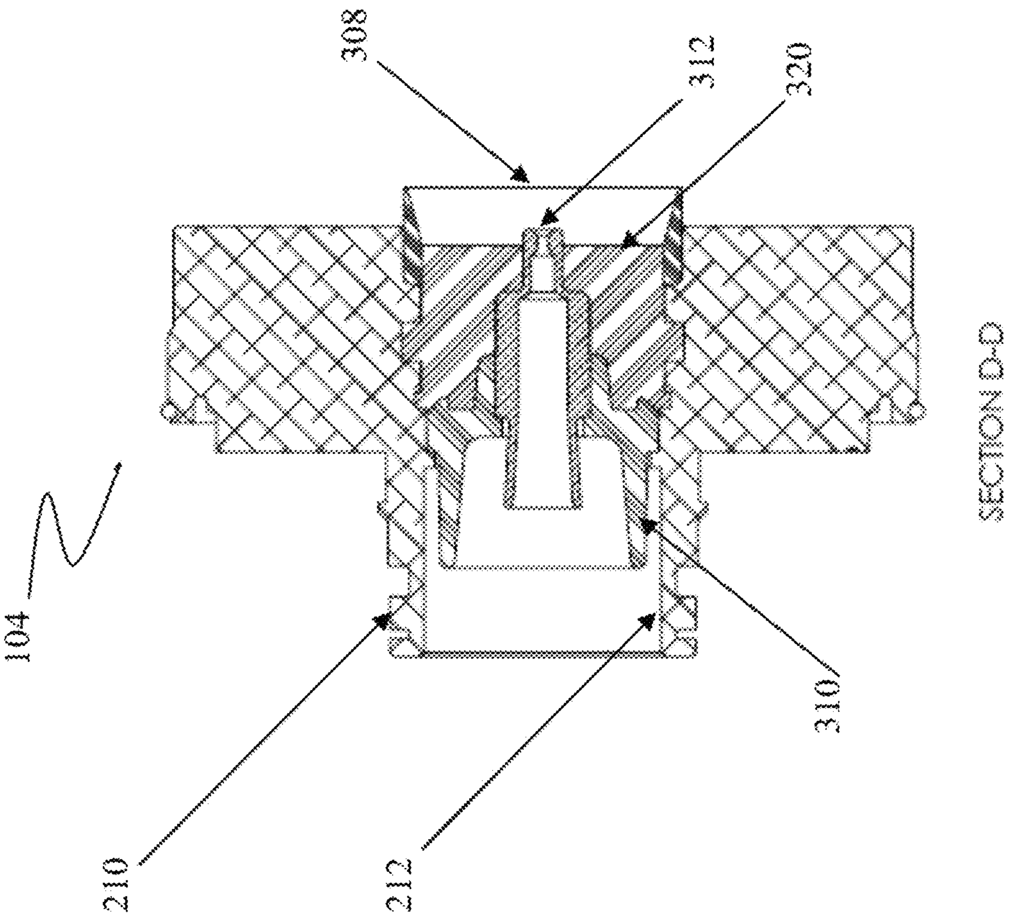
FIG. 4 illustrates a cross-sectional view of a male drift tube end cap in accordance with some embodiments of the present document.

In some embodiments, an exemplary male end cap 104 may be manufactured. FIGS. 2-4 illustrate various views of the exemplary male end cap 104, among which FIG. 4 is a cross-sectional view from D-D as illustrated in FIG. 2. The end cap 104 is substantially circular with two ends. The end cap 104 may, for example, be constructed from aluminum. A first end 202 on an inner surface of the male end cap 104 may be larger than a second end 204 on the outer surface 206 of the end cap 104. The first end 202 may include an outer wall 208 encompassing the circumference of the first end 202. The outer wall 208 may be sized to mate tightly with an inner wall of the reamed housing tube 102 to create a leak proof seal when the male end cap 104 and the housing tube 102 are mated together. The leak proof seal may be reinforced by a solder seal or through a chemical bond to assure essentially no gas inside the drift tube 100 escapes to the atmosphere from the interface of the male end cap 104 and the housing tube 102. The surface of the first end 202 may then be within the housing tube 102 upon mating.

Figure 6:
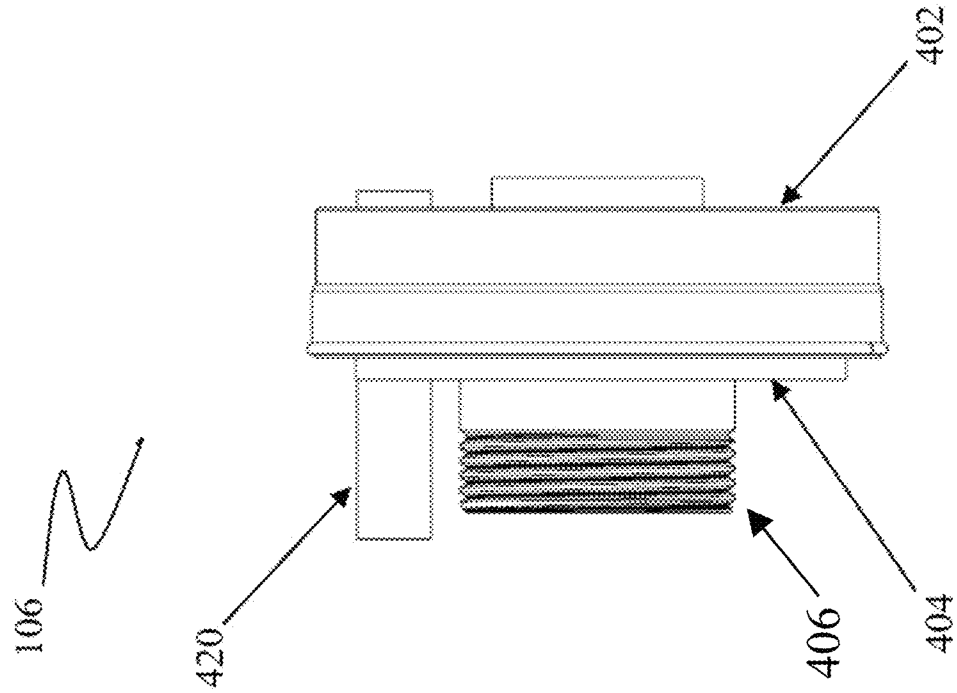
FIG. 6 illustrates a side view of a female drift tube end cap in accordance with some embodiments of the present document.

In some embodiments, the male end cap 104 includes a smaller cylindrical enclosure 210 on the second end 204 that extends from a base outer surface 206 of the second end 204 of the male end cap 104. The cylindrical enclosure 210 includes an inner surface 212. Referring FIGS. 2-4, the center of the first end 202 includes an opening 308. The opening 308 of the first end 202 is accessible within a volume enclosed by the inner wall 212 through the second end 204. The circumference of the inner wall 212 of the second end 204 may be substantially concentric with the opening 308 of the first end 202. In some embodiments, the male end cap 104 of a drift tube 100 may be configured to mate with the female end cap 106 of a neighboring drift tube 100 by connecting the second end 204 of the male end cap 104 with an end (e.g., end 406 on a side 404 as illustrated in FIG. 6) of the female end cap 106.

In some embodiments, the end cap 104 may be further processed with a sand blast application. For example, 220 grit aluminum oxide may be applied to the inner wall 212 and the first end 202 of the end cap 104. The purpose of the sand blast is to promote adhesion of an epoxy that may be included into the center of the opening and discussed further below. The end cap 104 may be further sonicated in pure isopropanol for example to remove aluminum dust after sand blasting.

Referring to FIGS. 2-4, in some embodiments, a coating may be applied to an inner wall of the opening 308 in the first end 202 where an epoxy 320 will come in contact with the opening 308. The coating may include a chromate coating. The end cap 104 may then be dried a time needed for a substantially completely anhydrous surface. In some embodiments, a 90-minute drying time may be needed, for example. The drying time may vary depending on a variety of conditions, and thus, the drying time of 90 minutes here is intended as one exemplary duration to substantially complete the drying of the epoxy 320.

Referring to FIGS. 2-4, in some embodiments, an epoxy holder 310 may be pressed into the opening 308 of the first end 202, for example, by an arbor press. The epoxy holder 310 may further act as a wall extender to extend the inner wall 212 of the opening 308.

Referring back to FIGS. 2-4, in some embodiments, an anode connector 312 may be applied securely into the opening 308 of the first end 202 at the outer surface within the inner walls of the second end 204. The anode connector 312 may, for example, include a tungsten alloy. A first end of the anode connector 312 extends outward from the outer surface 206 of the second end 204 of the end cap 104 and a second end of the anode connector 312 extends partially inward from the inner surface of the first end 202 of the end cap 104 into the interior of the housing tube 102 when mated.

The female end cap 106 may be manufactured similarly. One or both of the male end cap 104 and the female end cap 106 may include at least one fill tube (e.g., the fill tube 702, the fill tube 420).

Epoxy Process

The epoxy 320 may be obtained from many manufacturers. For example, Resin Lab EP 1350 may be used. ResinLab EP1350 is a two-part (including, e.g., resin as part A and a hardener as part B), high-performance epoxy encapsulant designed for electronic potting and encapsulating. Merely by way of example, 3.25 parts of part A by weight to 1 part of part B by weight of the epoxy mixture may be used. Bubbles in the epoxy mixture may be removed by placing the mixture in a vacuum chamber for degassing. The epoxy mixture substantially free of bubbles may be beneficial for the end cap 104 to function properly in the drift tube 100.

In some embodiments, the epoxy mixture may be placed into a syringe which may be, for example, attached to a pneumatic dispenser unit. The epoxy mixture may then be potted to the center of the opening 308 of the first end 202 of the end cap 104. The epoxy 320 may be applied so as not to cover an end of the anode connector 312 which may then protrude slightly from or beyond the epoxy 320.

The end cap 104 may then be placed into an oven for curing. For example, a temperature of approximately 90° C. for 2 hours, 150° C. for 3 hours and 180° C. for 3 hours may be used in some exemplary embodiments. The curing times may vary. These curing times and temperatures are provided here as examples only and not intended to be limiting. The end cap 104 may then be placed, e.g., at room temperature, for cooling. In addition, surface bubbles may be removed.

The female end cap 106 may be manufactured similarly as the male end cap 104.

Fill Tube

Figure 5:
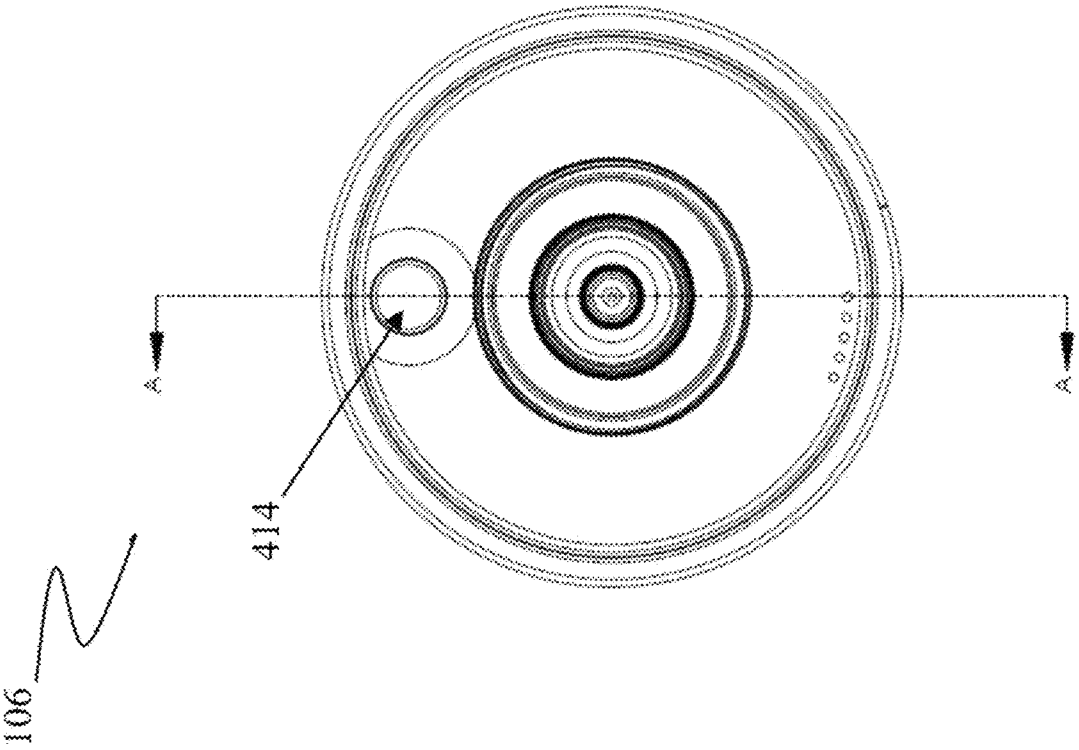
FIG. 5 illustrates a plan view of a female drift tube end cap in accordance with some embodiments of the present document.
Figure 7:
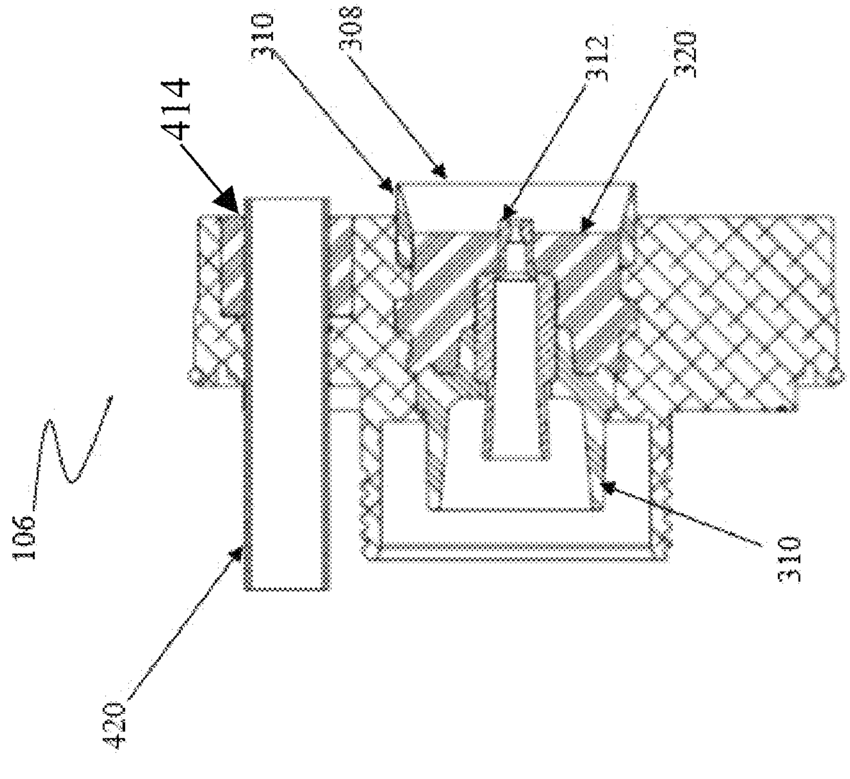
FIG. 7 illustrates a cross-sectional view of a female drift tube end cap in accordance with some embodiments of the present document.

In some embodiments, referring to FIGS. 1C-7, the process for manufacturing each of the male 104 and female 106 end caps may be substantially the same except that the female end cap 106 may further include a fill tube (e.g., a copper fill tube) 420. The female end cap 106 may further include a second opening 414 in the first end of the female end cap 106. The second opening 414 may be smaller than the opening 308 as illustrated in FIG. 7 (a cross-sectional view of the female end cap 106 viewed from A-A as illustrated in FIG. 5). The opening 308 in FIG. 7 in the female end cap 106 is manufactured in a same or similar process as described above with respect to the male end cap 104. A second opening 414 may extend from the outer surface on a second side 404 of the female end cap 106 through the inner surface (or referred to as the inner side or the first side) 402 of the female end cap 106. A fill tube (e.g., a copper tube) 420 is inserted through the second opening 414 to allow the gas to be filled into the housing tube 102 when mated with the end caps 104, 106. The fill tube 420 may then be sealed with the epoxy 320 as discussed above with respect to the male end cap 104 in some exemplary embodiments. The epoxy 320 may be potted around the fill tube 420 at the inner surface 402 of the female end cap 106 and cured as discussed above.

In some embodiments, an anode wire 108 may be inserted through each anode connector 312 of each of the female 106 and male end caps 104. The male 104 and female 106 end caps may then be mated to the housing tube 102 with the anode wire 108 traversing along the length of the housing tube 102 and connected to each end cap 104, 106. Once mated the wire 108 (e.g., a copper wire) may then be made tight and secured at each of the end caps 104, 106. The anode wire 108 may be positioned substantially centrally along the longitudinal axis X (or along the length) of the housing tube 102.

In some embodiments, the now assembled drift tube 100 may be filled with the inert gas filled through the fill tube 420. The gas filling may be monitored and continue until the proper pressure is reached within the housing tube 102. The fill tube 420 may then be crimped and sealed.

Final Processing

The male and female end caps 104, 106 may then further be sealed with a solder seal around the circumference of the border between the end cap 104, 106 and the housing tube 102.

The assembled drift tube 100 may then be tested for leakage and other required testing.

The second threaded end 204 of each of the male 104 and female 106 end caps are enabled to be further connected to an electronic circuit (not shown) so that electric signals activated on the anode wire 108 as a result of reactions between the charge particles and the inert gas can be received for measurement and analysis.

It should be noted that a great deal of experimentation, analysis from deployments and further research has been expended to determine the sensitivity and specifications for the enhanced resolution of muons with the use of the drift tubes of the present subject matter.

Glass Insulator at End Cap

In some implementations, a drift tube may use a glass insulator at the aluminum end cap where the glass insulator is selected to have a coefficient of thermal expansion CTE that is sufficiently close to the CTE of the end cap to withstand the expansion and contraction of aluminum and copper across serviceable temperature range.

FIGS. 8A-8D show examples. This design provides a gas tight, moisture tight seal at each end of the drift tube that is highly reliability.

Figure 8B:
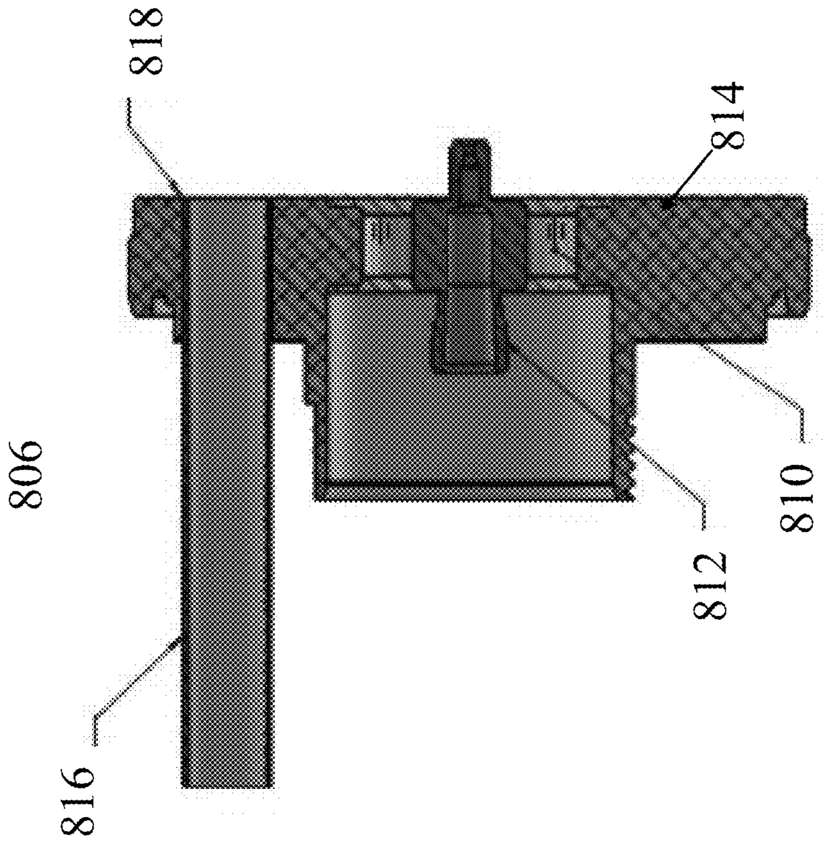
FIGS. 8A and 8B illustrate a plan view and a cross-sectional view of a female drift tube end cap using a glass insulator in accordance with some embodiments of the present document.
Figure 8A:
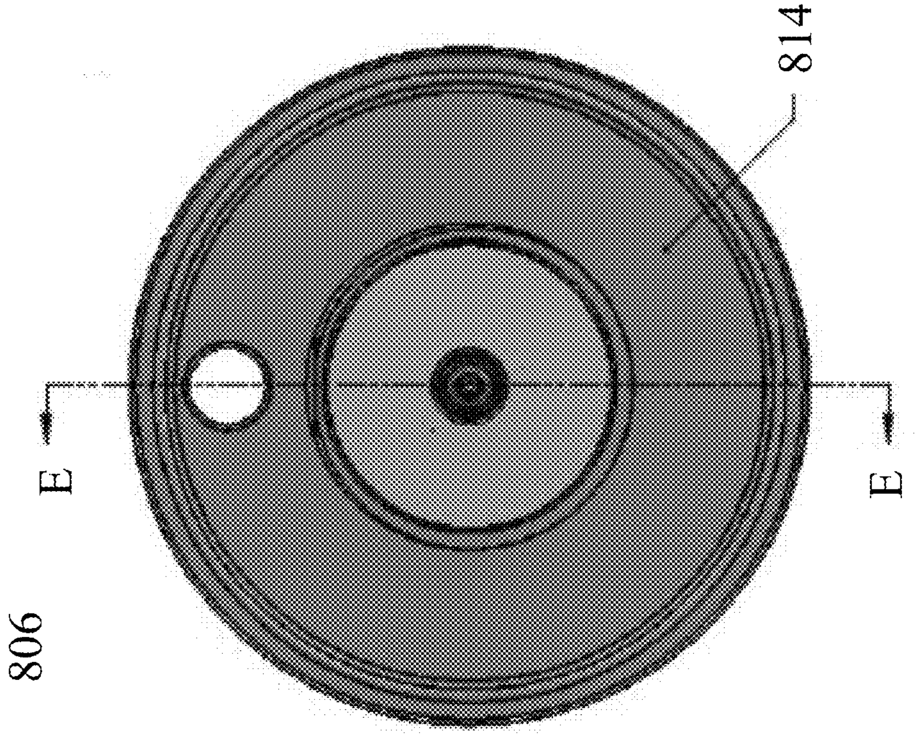

Referring to an exemplary female end cap 806 of the present embodiment shown in FIGS. 8A and 8B (in which FIG. 8B is a cross-sectional view of the female end cap 806 viewed from E-E as illustrated in FIG. 8A), the glass insulator 810 is used to connect the outer circumference of the anode connector 812 to the inner diameter of the end cap 806. The end cap 806 may include a cap body 814. This design holds the anode connector 812 in the center of the tube and the wire centered within the tube walls. In implementations, an aluminum fill tube 816 can be pressed into the end cap 806 (e.g., via an opening 818 on the end cap 806). The joint between the end cap 806 and the fill tube 816 may be formed using a suitable method, e.g., laser welding, to provide a robust joint that is leak tight and resists damage from the crimping forces exerted on the fill tube during production.

Figure 8D:
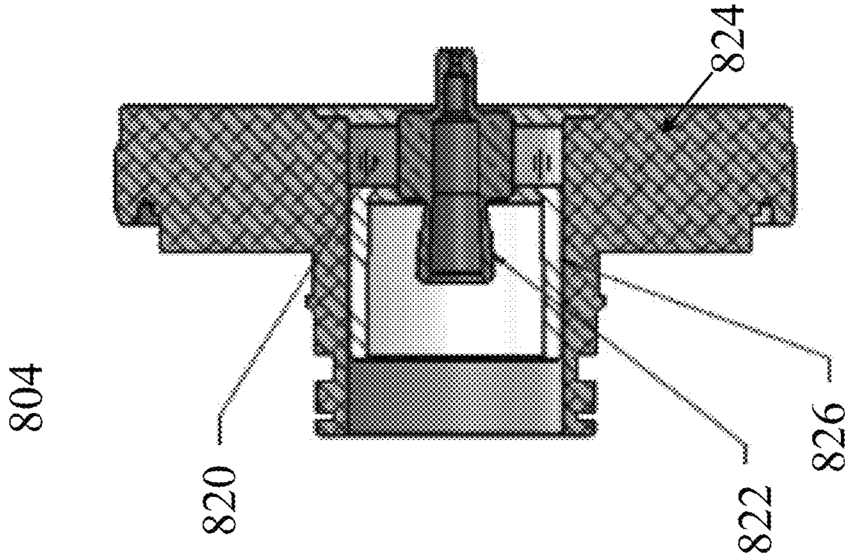
FIGS. 8C and 8D illustrate a plan view and a cross-sectional view of a male drift tube end cap using a glass insulator in accordance with some embodiments of the present document.
Figure 8C:
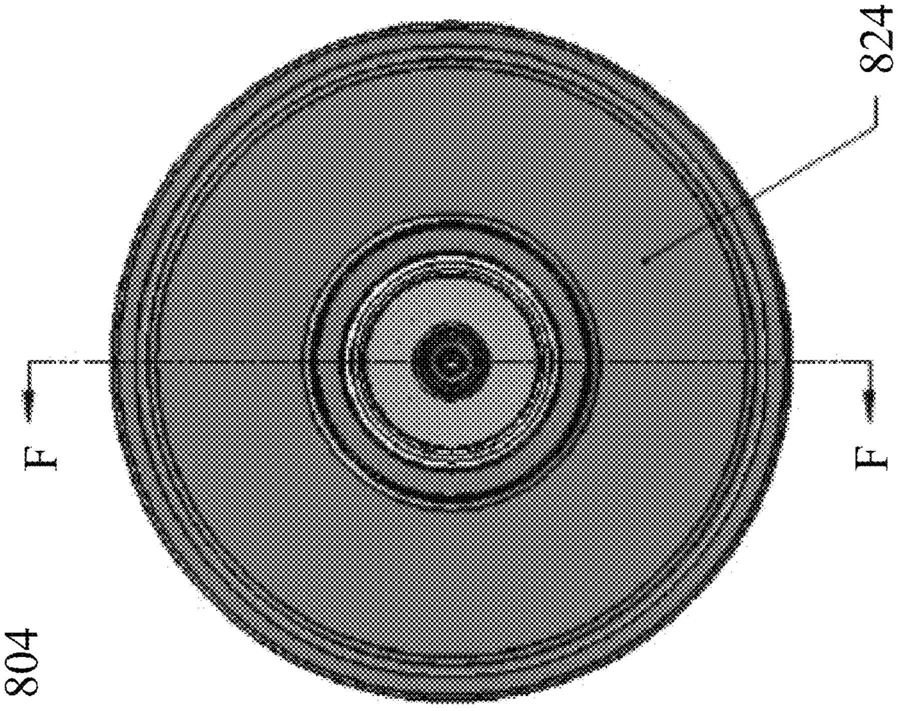

Referring to an exemplary male end cap 804 of the present embodiment shown in FIGS. 8C and 8D (in which FIG. 8D is a cross-sectional view of the male end cap 804 viewed from F-F as illustrated in FIG. 8C), the glass insulator 820 may be used to connect the outer circumference of the anode connector 822 to the inner diameter of the end cap 804. The end cap 804 may include a cap body 824. This design may hold the anode connector 822 in the center of the tube (e.g., the housing tube 102) and the anode wire (e.g., the anode wire 108) substantially centered within the housing tube (e.g., the housing tube 102). In implementations, the end cap 804 and/or 806 may be engaged to the tube wall of the housing tube 102 via welding without using a filler metal in between. Optionally, nylon insulators or other insulators 826 may be pressed into the inner diameter of the end cap 804 and/or 806 up to the glass insulator 820 to add additional electrical stand off and resist surface creepage/tracking.

Advantageously, epoxy fill/bond replaced by glass bond greatly increases the hermetic sealing of the 'End Caps. Various aluminum alloy materials may be used in implementations, including commercial aluminum alloys 6061 and 5083. The aluminum alloy 6061 (Unified Numbering System (UNS) designation A96061) is a precipitation-hardened aluminum alloy, containing magnesium and silicon. The commercial 5083 aluminum alloy is an contains magnesium and traces of manganese and chromium and may be used to make the fabricated end caps, allowing welding the end caps directly to the tube (without using weld rings) to provide improved hermetic sealing of the tubes and reduce assembly time and improved welding process.

Figure 9:
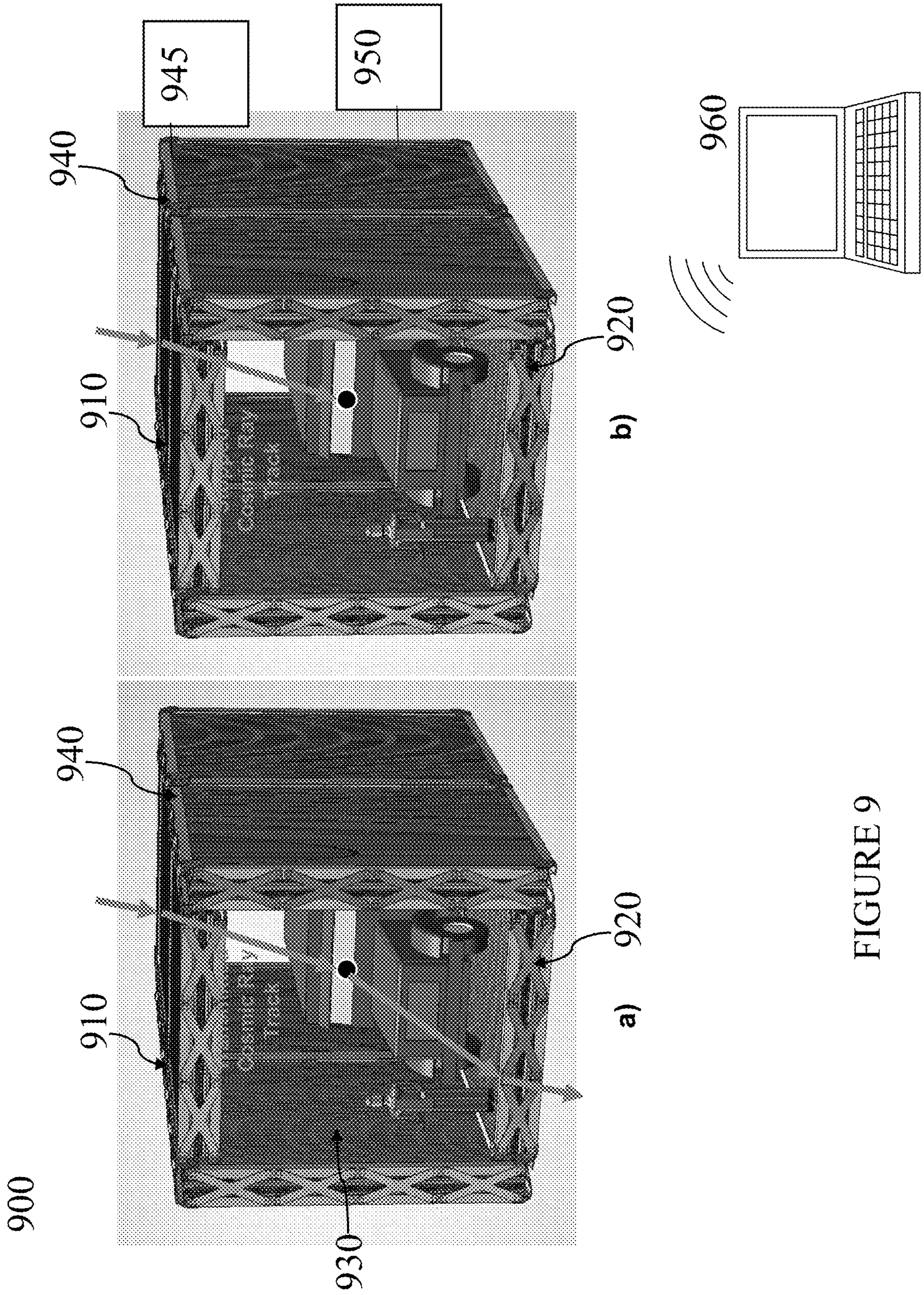
FIG. 9 illustrates a detection system in accordance with some embodiments of the present document.

FIG. 9 illustrates a detection system in accordance with some embodiments of the present document. The detection system 900 may include a first set of position sensitive muon detectors 910 located on a first side of an object holding area 930 to measure positions and directions of incident muons towards the object holding area 930; a second set of position sensitive muon detectors 920 located on a second side of the object holding area 930 opposite to the first side to measure positions and directions of outgoing muons exiting the object holding area 930, and a signal processing unit 960 to receive data of measured signals of the incoming muons from the first set of position sensitive muon detectors and measured signals of the outgoing muons from the second set of position sensitive muon detectors. The first and second sets of position sensitive detectors 910 and 920 may be structured and arranged to allow at least three charged particle positional measurements in a first direction and at least three charged particle positional measurements in a second direction different from the first direction. The system 900 may include a mounting framework 940 configured to support various components of the system 900. For example, the mounting framework 940 may be configured to hold the plurality of drift tubes in the first and second sets of position sensitive detectors 910 and 920 in a predefined spatial arrangement. In some embodiments, the mounting framework 940 may include adjustable supports (e.g., spring-connected supports) for aligning the drift tubes in the predefined spatial arrangement. The system 900 may include a data acquisition system 945 operably connected to first and second sets of position sensitive detectors 910 and 920 to acquire signals relating to incoming and outgoing positions and directions of muons that reflect behaviors and/or energy of the muons, or a change thereof, which in turn relate to the materials in the object holding area 930. The signal processing unit 960 may be configured to analyze scattering behaviors of the muons caused by scattering of the muons in materials within the object holding area 930 based on the measured incoming and outgoing positions and directions of muons to obtain a tomographic profile or a spatial distribution of scattering centers within the object holding area 930, and to generate an obtained cosmic muon image of the object, cargo, or vehicle under inspection. On the left (a) is an illustration of a transmitted cosmic ray and on the right (b) is an illustration of a stopped cosmic ray. The system 900 may be configured to detect threat in an object, cargo or vehicle under inspection.

Figure 10:
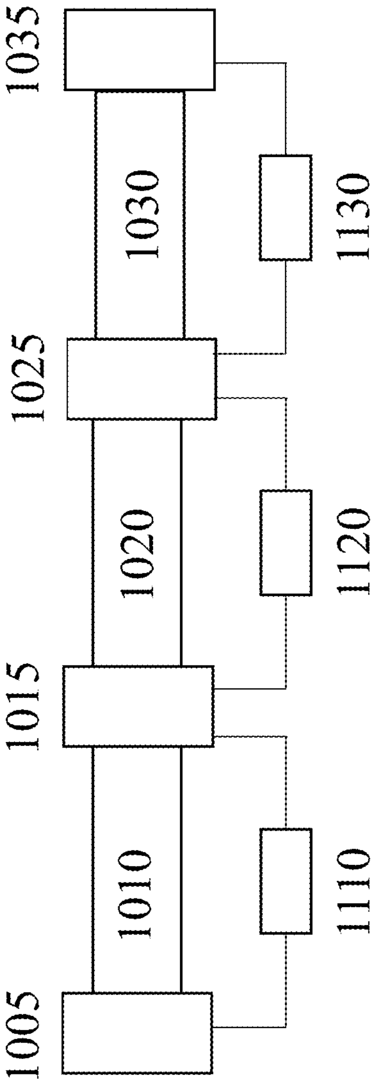
FIG. 10 illustrates drift tubes in a series connection in accordance with some embodiments of the present document.

The first and second sets of position sensitive detectors 910 and 920 may each include a plurality of drift tubes. Multiple drift tubes may be coupled in a series connection. For example, as illustrated in FIG. 10, the system 900 includes a first drift tube 1010, a second drift tube 1020, and a third drift tube 1030 in a series connection; each of the first drift tube 1010, the second drift tube 1020, and the third drift tube 1030 includes at least one of a male end cap or a female end cap, the first, second, and third drift tubes are in a series connection; the series connection is formed by a male end cap of the first drift tube 1010 coupled to a female end cap of the second drift tube 1020 at a conjunction 1015, and a male end cap of the second drift tube 1020 couple to a female end cap of the third drift tube 1030 at a conjunction 1025. The male and female end caps may include complementary threading for screw-type connection, facilitating easy assembly and disassembly of the drift tubes 1010, 1020, and 1030. The connection between adjacent drift tubes may be facilitated by male and female end caps, with the male end cap of one drift tube designed to fit securely into the female end cap of an adjacent drift tube. The male and female end caps may include a threaded connection mechanism, allowing for a screw-type assembly that provides both mechanical stability and ease of modular configuration. The connection between the male and female end caps includes a sealing mechanism, such as O-rings or gaskets, to maintain a gas-tight seal within each drift tube. One or more of the end caps of the drift tubes 1010, 1020, and 1030 may be equipped with alignment features (e.g., a guiding pin, a groove) configured to achieve alignment of the drift tubes when connected. The system 900 may include multiple drift tubes connected in series to achieve one or more technical benefits including, e.g., spatial efficiency and a larger effective detection area, while maintaining individual measurement capabilities. This arrangement allows for a precise detection and tracking of particles over a larger volume.

In some embodiments, at least two of the first drift tube 1010, the second drift tube 1020, and the third drift tube 1030 may be electrically or fluidly isolated from each other. For example, the drift tubes 1010-1030 are connected in series, while each has its own separate anode wire and read-out electronics 1110-1130, respectively, such that each drift tube is designed to independently measure the position and time of ionization events within its own volume, thereby allowing for precise localization of these events. The read-out electronics 1110-1130 may be operably connected the drift tubes 1010-1030 at the end caps 1005 and 1035, and the conjunction 1015 and 1025. Having individual anode wires and/or separate read-out electronics may help in maintaining the clarity and distinctiveness of the signal from each drift tube, which is crucial for accurate data analysis. An anode wire may operate under a high voltage to create the electric field needed for the functioning of a drift tube. Independent wires and/or separate read-out electronics may allow for more precise control of this voltage in each drift tube. Separate anode wires and/or separate read-out electronics and/or separate read-out electronics may provide electrical isolation between drift tubes, reducing the risk of electrical interference and allowing for more stable operation. Individual anode wires and/or separate read-out electronics may offer greater modularity and flexibility in the design and configuration of the detection system. Drift tubes can be added, removed, or replaced without affecting the entire array. With separate anode wires, maintenance and repair of individual drift tubes are easier. A fault in one tube's wire does not necessitate the dismantling or disruption of the entire series. In some embodiments, more than one drift tubes may be electrically and/or fluidly connected to simplify the setup (e.g., setup of the read-out electronics).

In some embodiments, the system 900 may include a portable power supply unit 950 for powering the drift tubes of the first and second sets 910 and 920, and the data acquisition system 945, the signal processing unit 960, the communication between these and/or other components of or external to the system 900. For example, the portable power supply unit 950 may include one or more batteries, or a solar panel, a wind turbine, etc. The data acquisition system 945 and/or the signal processing unit 960 may include wireless communication capabilities for remote data transmission and system control.

Figure 11:
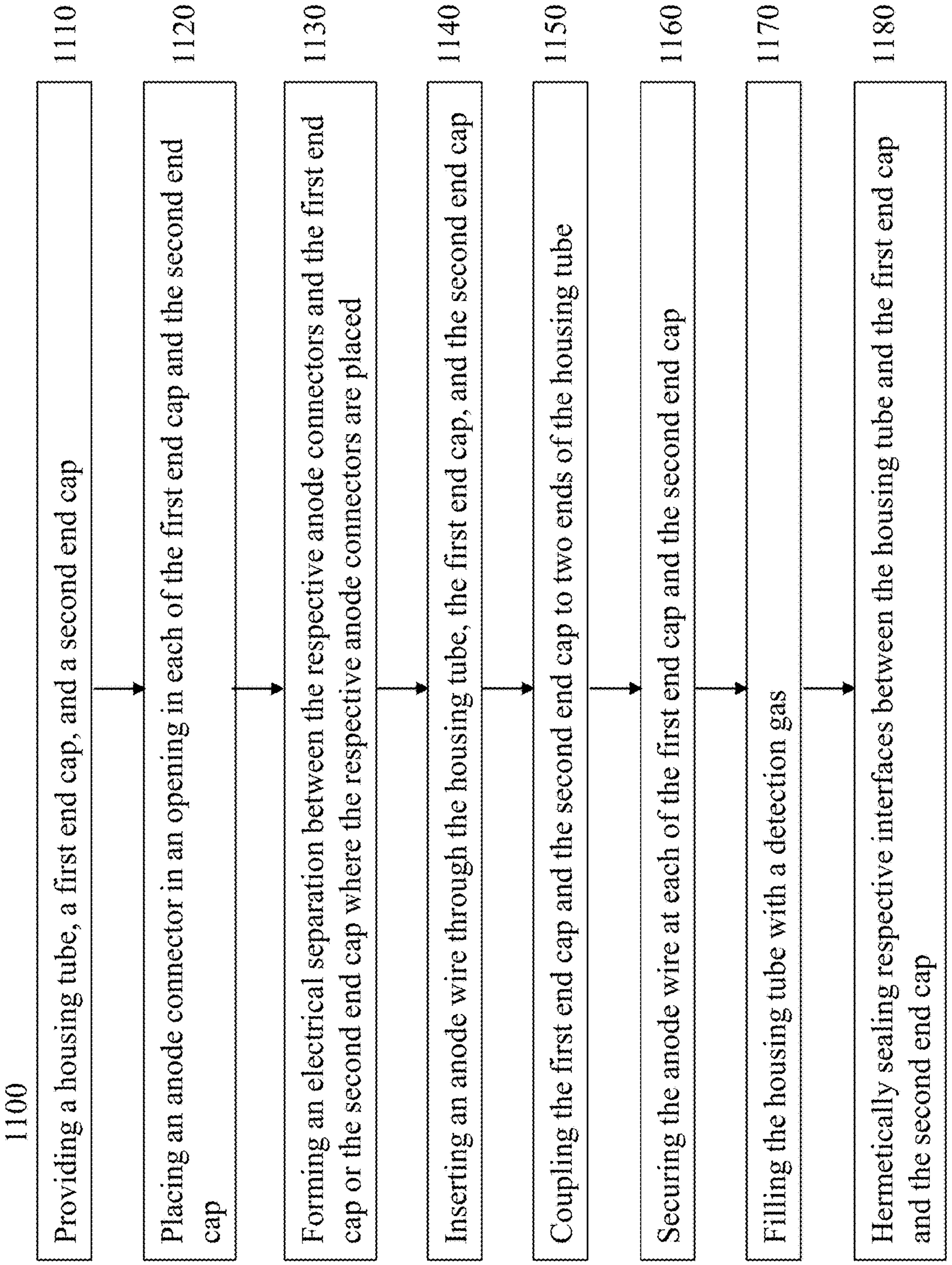
FIG. 11 illustrates a flowchart of a process for producing a drift tube in accordance with some embodiments of the present document.

FIG. 11 illustrates a flowchart of a process for producing a drift tube in accordance with some embodiments of the present document. A process 1100 of producing a drift tube may include. At 1110, providing a housing tube, a first end cap, and a second end cap; at 1120, placing an anode connector in an opening in each of the first end cap and the second end cap; at 1130, forming an electrical separation between the respective anode connectors and the first end cap or the second end cap where the respective anode connectors are placed; at 1140, inserting an anode wire through the housing tube, the first end cap, and the second end cap; at 1150, coupling the first end cap and the second end cap to two ends of the housing tube; at 1160, securing the anode wire at each of the first end cap and the second end cap; at 1170, filling the housing tube with a detection gas; and at 1180, hermetically sealing respective interfaces between the housing tube and the first end cap and the second end cap.

The process 1100 may include, at 1130, forming the electrical separation by applying an epoxy encapsulant around the anode connector and within the opening in each of the first end cap and the second end cap; and curing the first end cap and the second end cap in an oven for a curing period. The process 1100 may further include degassing the epoxy encapsulant before application around the anode connectors within the openings. The process 1100 may further include processing the openings in the first end cap and the second end cap with a sand blast application before the application of the epoxy encapsulant within the openings. The process 1100 may further include removing, by sonication, dust from the openings after the sand blast application and before the application of the epoxy encapsulant within the openings.

The process 1100 may include, at 1130, forming the electrical separation by snugly fitting an electrical insulator between the respective anode connectors and the first end cap or the second end cap where the respective anode connectors are placed. The electrical insulator may include a glass insulator.

The process 1100 may further include securing a fill tube on at least one of the first end cap or the second end cap. The detection gas may be filled into the housing tube via the fill tube. The process 1100 may include sealing the fill tube after filling the detection gas by, e.g., crimping, an epoxy encapsulant, etc. For example, the filling tube may be deformed (e.g., manually by a user using a tool or automatically using a machine) so that the opening of the filling tube to the ambient is sealed.

The disclosed technology for drift tubes can be implemented in various ways. The following are examples of some of the implementations.

Implementation 1. A drift tube for detecting charged particles inside the drift tube, comprising:

a housing tube extending along a longitudinal axis and structured to include a first end, a second end, and an internal surface configured as a cathode;

a first end cap hermetically engaged to and electrically isolated from the first end of the housing tube;

a second end cap hermetically engaged to and electrically isolated from the second end of the housing tube;

a detection gas enclosed inside the housing tube and configured for undergo ionization by charged particles; and an anode wire having two wire terminals engaged to the first end cap and the second end cap, respectively, so that the anode wire traverses the housing tube along the longitudinal axis, the anode wire being configured to detect the ionization that indicates a track of the charged particles inside the drift tube.

Implementation 2. The drift tube of any one or more of Implementation 1 or other Implementations disclosed herein, wherein the first end cap comprises a first anode connector electrically connected to one of the two wire terminals.

Implementation 3. The drift tube of any one or more of Implementation 2 or other Implementations disclosed herein, wherein the first anode connector is electrically isolated from the first end cap using an electrically insulating material.

Implementation 4. The drift tube of any one or more of Implementation 3 or other Implementations disclosed herein, wherein the electrically insulating material includes at least one of glass or epoxy.

Implementation 5. The drift tube of any one or more of Implementation 2 or other Implementations disclosed herein, wherein the first anode connector extends into the housing tube.

Implementation 6. The drift tube of any one or more of Implementation 2 or other Implementations disclosed herein, wherein the first anode connector extends beyond the first end cap to outside the housing tube.

Implementation 7. The drift tube of any one or more of Implementation 2 or other Implementations disclosed herein, wherein:

the first anode connector is electrically isolated from the first end cap using an insulator, the first anode connector has an outer circumference that opposes an inner wall of the first end cap, and the insulator snugly fits between the outer circumference of the first anode connector and the inner wall of the first end cap.

Implementation 8. The drift tube of any one or more of Implementation 1 or other Implementations disclosed herein, wherein the anode wire is positioned substantially centrally along the longitudinal axis of the housing tube.

Implementation 9. The drift tube of any one or more of Implementation 1 or other Implementations disclosed herein, wherein each of the first end cap and the second end cap comprises a tensioning mechanism configured to tension the anode wire.

Implementation 10. The drift tube of any one or more of Implementation 9 or other Implementations disclosed herein, wherein the tensioning mechanism is configured to be adjustable to main a predetermined tension on the anode wire.

Implementation 11. The drift tube of any one or more of Implementation 9 or other Implementations disclosed herein, wherein the tensioning mechanism comprises a spring-loaded assembly configured to compensate for thermal expansion and contraction of the anode wire.

Implementation 12. The drift tube of any one or more of Implementation 1 or other Implementations disclosed herein, wherein at least one of the first end cap or the second end cap is made of at least one of aluminum or carbon fiber.

Implementation 13. The drift tube of any one or more of Implementation 1 or other Implementations disclosed herein, wherein one of the first end cap or the second end cap is a male end cap and the other is a female end cap, designed to allow for modular connection with adjacent drift tubes in a series configuration.

Implementation 14. The drift tube of any one or more of Implementation 13 or other Implementations disclosed herein, wherein the male and female end caps include complementary threading for screw-type connection.

Implementation 15. The drift tube of any one or more of Implementation 1 or other Implementations disclosed herein, further comprising a fill tube hermetically coupled to the first end cap through which the detection gas is filled into the housing tube.

Implementation 16. The drift tube of any one or more of Implementation 1 or other Implementations disclosed herein, wherein the detection gas comprises a noble gas.

Implementation 17. The drift tube of any one or more of Implementation 16 or other Implementations disclosed herein, wherein the detection gas further comprises a quencher gas.

Implementation 18. The drift tube of any one or more of Implementation 1 or other Implementations disclosed herein, wherein the housing tube is made of at least one of aluminum or carbon fiber.

Implementation 19. The drift tube of any one or more of Implementation 1 or other Implementations disclosed herein, wherein the anode wire is made of at least one of copper, aluminum, tungsten, stainless steel, graphite, or an alloy thereof.

Implementation 20. The drift tube of one or more of Implementation 1 or other Implementations disclosed herein, in which at least one of the first end cap or the second end cap includes an integrated electrical feed-through for connecting the anode wire to an external power source and signal processing electronics.

Implementation 21. A detection system comprising:

a plurality of drift tubes as in any one or more of Implementations 1-20 or other Implementations disclosed herein;

a mounting framework to hold the plurality of drift tubes in a predefined spatial arrangement; and a data acquisition system operably coupled to the plurality of drift tubes for collecting and processing data from the drift tubes.

Implementation 22. The detection system of any one or more of Implementation 21 or other Implementations disclosed herein, comprising a first drift tube, a second drift tube, and a third drift tube, wherein:

each of the first drift tube, the second drift tube, and the third drift tube comprises at least one of a male end cap or a female end cap;

the first, second, and third drift tubes are in a series connection; and the series connection is formed by a male end cap of the first drift tube coupled to a female end cap of the second drift tube, and a male end cap of the second drift tube couple to a female end cap of the third drift tube.

Implementation 23. The detection system of any one or more of Implementation 22 or other Implementations disclosed herein, wherein the male end cap of the first drift tube and the female end cap of the second drift tube include a threaded connection mechanism configured to allow for a screw-type connection of the first drift tube and the second drift tube.

Implementation 24. The detection system of any one or more of Implementation 22 or other Implementations disclosed herein, wherein at least two of the first drift tube, the second drift tube, and the third drift tube are electrically or fluidly isolated from each other.

Implementation 25. The detection system of any one or more of Implementation 21 or other Implementations disclosed herein, wherein the end caps are equipped with alignment features configured to achieve alignment of the drift tubes when connected.

Implementation 26. The detection system of any one or more of Implementation 21 or other Implementations disclosed herein, wherein the mounting framework includes adjustable supports for aligning the drift tubes in the predefined spatial arrangement.

Implementation 27. The detection system of any one or more of Implementation 21 or other Implementations disclosed herein, further comprising a portable power supply unit for powering the drift tubes and the data acquisition system.

Implementation 28. The detection system of any one or more of Implementation 21 or other Implementations disclosed herein, wherein the data acquisition system includes wireless communication capabilities for remote data transmission and system control.

Implementation 29. A method of producing a drift tube, the method comprising:

providing a housing tube, a first end cap, and a second end cap;

placing an anode connector in an opening in each of the first end cap and the second end cap;

forming an electrical separation between the respective anode connectors and the first end cap or the second end cap where the respective anode connectors are placed;

inserting an anode wire through the housing tube, the first end cap, and the second end cap;

coupling the first end cap and the second end cap to two ends of the housing tube;

securing the anode wire at each of the first end cap and the second end cap;

filling the housing tube with a detection gas; and hermetically sealing respective interfaces between the housing tube and the first end cap and the second end cap.

Implementation 30. The method of any one or more of Implementation 29, or other Implementations disclosed herein wherein forming the electrical separation comprises:

applying an epoxy encapsulant around the anode connector and within the opening in each of the first end cap and the second end cap; and curing the first end cap and the second end cap in an oven for a curing period;

Implementation 31. The method of any one or more of Implementation 30 or other Implementations disclosed herein, further comprising:

degassing the epoxy encapsulant before application around the anode connectors within the openings.

Implementation 32. The method of any one or more of Implementation 30 or other Implementations disclosed herein, further comprising:

processing the openings in the first end cap and the second end cap with a sand blast application before the application of the epoxy encapsulant within the openings.

Implementation 33. The method of any one or more of Implementation 32 or other Implementations disclosed herein, further comprising:

removing, by sonication, dust from the openings after the sand blast application and before the application of the epoxy encapsulant within the openings.

Implementation 34. The method of any one or more of Implementation 29 or other Implementations disclosed herein, wherein forming the electrical separation comprises:

snugly fitting an electrical insulator between the respective anode connectors and the first end cap or the second end cap where the respective anode connectors are placed.

Implementation 35. The method of any one or more of Implementation 34 or other Implementations disclosed herein, wherein the electrical insulator comprises a glass insulator.

Implementation 36. The method of any one or more of Implementation 29 or other Implementations disclosed herein, further comprising:

securing a fill tube on at least one of the first end cap or the second end cap.

Implementation 37. The method of any one or more of Implementation 36 or other Implementations disclosed herein, wherein the detection gas is filled into the housing tube via the fill tube.

Implementation 38. The method of any one or more of Implementation 37 or other Implementations disclosed herein, further comprising: sealing the fill tube after filling the detection gas.

Implementation 39. A muon tomography system for detecting threat in an object, cargo, or vehicle under inspection, comprising:

a first set of position sensitive muon detectors located on a first side of an object holding area to measure positions and directions of incident muons towards the object holding area;

a second set of position sensitive muon detectors located on a second side of the object holding area opposite to the first side to measure positions and directions of outgoing muons exiting the object holding area, wherein each of the first and second sets of position sensitive detectors is structured and arranged to allow at least three charged particle positional measurements in a first direction and at least three charged particle positional measurements in a second direction different from the first direction; and a signal processing unit to receive data of measured signals of the incoming muons from the first set of position sensitive muon detectors and measured signals of the outgoing muons from the second set of position sensitive muon detectors, the signal processing unit configured to analyze scattering behaviors of the muons caused by scattering of the muons in materials within the object holding area based on the measured incoming and outgoing positions and directions of muons to obtain a tomographic profile or a spatial distribution of scattering centers within the object holding area, and to generate an obtained cosmic muon image of the object, cargo, or vehicle under inspection, wherein each position sensitive muon detector includes at least one drift tube as in any one or more of Implementation 1-20 or other Implementations disclosed herein.

Implementation 40. A muon tomography system for detecting threat in an object, cargo or vehicle under inspection using a detection system of any one or more of Implementations 21-28 or other Implementations disclosed herein.

Implementation 41. A method for detecting threat in an object, cargo or vehicle under inspection using a detection system of any one or more of Implementations disclosed herein.

It will be appreciated that the present document discloses techniques that can be embodied in various embodiments to allow a UE-triggered reporting of beam report information. Specifically, events for beam reporting are defined based on measurement quality variation monitoring among beams at different time instances/beam groups or for different channels/RSs. The beam reporting would be triggered if any of the pre-defined events occurs. As the event-triggered beam report is initiated by the UE on demand, the reporting latency and uplink reporting resource consumption can be greatly reduced compared with the conventional beam report method.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this patent document contains many specifics, these should not be construed as limitations on the scope of any invention or of what may be Claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially Claimed as such, one or more features from a Claimed combination can in some cases be excised from the combination, and the Claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A drift tube for detecting charged particles inside the drift tube, comprising:

a housing tube extending along a longitudinal axis and structured to include a first end, a second end, and an internal surface configured as a cathode;

a first end cap hermetically engaged to and electrically isolated from the first end of the housing tube;

a second end cap hermetically engaged to and electrically isolated from the second end of the housing tube;

a detection gas enclosed inside the housing tube and configured to undergo ionization by charged particles; and an anode wire having two wire terminals engaged to the first end cap and the second end cap, respectively, so that the anode wire traverses the housing tube along the longitudinal axis, the anode wire being configured to detect the ionization that indicates a track of the charged particles inside the drift tube, wherein one of the first end cap or the second end cap is a male end cap and the other is a female end cap, designed to allow for modular connection with adjacent drift tubes in a series configuration.

2. The drift tube of claim 1, wherein the first end cap comprises a first anode connector electrically connected to one of the two wire terminals.

3. The drift tube of claim 2, wherein the first anode connector is electrically isolated from the first end cap using an electrically insulating material.

4. The drift tube of claim 3, wherein the electrically insulating material includes at least one of glass or epoxy.

5. The drift tube of claim 2, wherein the first anode connector extends into the housing tube.

6. The drift tube of claim 2, wherein the first anode connector extends beyond the first end cap to outside the housing tube.

7. The drift tube of claim 2, wherein:

the first anode connector is electrically isolated from the first end cap using an insulator, the first anode connector has an outer circumference that opposes an inner wall of the first end cap, and the insulator snugly fits between the outer circumference of the first anode connector and the inner wall of the first end cap.

8. The drift tube of claim 1, wherein the anode wire is positioned substantially centrally along the longitudinal axis of the housing tube.

9. The drift tube of claim 1, wherein each of the first end cap and the second end cap comprises a tensioning mechanism configured to tension the anode wire.

10. The drift tube of claim 9, wherein the tensioning mechanism is configured to be adjustable to maintain a predetermined tension on the anode wire.

11. The drift tube of claim 9, wherein the tensioning mechanism comprises a spring-loaded assembly configured to compensate for thermal expansion and contraction of the anode wire.

12. The drift tube of claim 1, wherein at least one of the first end cap or the second end cap is made of at least one of aluminum or carbon fiber.

13. The drift tube of claim 1, wherein the male and female end caps include complementary threading for screw-type connection.

14. The drift tube of claim 1, further comprising a fill tube hermetically coupled to the first end cap through which the detection gas is filled into the housing tube.

15. The drift tube of claim 1, wherein the detection gas comprises at least one of a noble gas or a quencher gas.

16. The drift tube of claim 1, wherein the housing tube is made of at least one of aluminum or carbon fiber.

17. The drift tube of claim 1, wherein the anode wire is made of at least one of copper, aluminum, tungsten, stainless steel, graphite, or an alloy thereof.

18. A detection system comprising:

a plurality of drift tubes, each of which comprises:

a housing tube extending along a longitudinal axis and structured to include a first end, a second end, and an internal surface configured as a cathode;

a first end cap hermetically engaged to and electrically isolated from the first end of the housing tube;

a second end cap hermetically engaged to and electrically isolated from the second end of the housing tube;

a detection gas enclosed inside the housing tube and configured to undergo ionization by charged particles; and an anode wire having two wire terminals engaged to the first end cap and the second end cap, respectively, so that the anode wire traverses the housing tube along the longitudinal axis, the anode wire being configured to detect the ionization that indicates a track of the charged particles inside the drift tube, wherein the plurality of drift tubes comprise a first drift tube, a second drift tube, and a third drift tube, each of the first drift tube, the second drift tube, and the third drift tube comprising at least one of a male end cap or a female end cap;

the first, second, and third drift tubes being in a series connection; and the series connection being formed by a male end cap of the first drift tube coupled to a female end cap of the second drift tube, and a male end cap of the second drift tube coupled to a female end cap of the third drift tube;

a mounting framework to hold the plurality of drift tubes in a predefined spatial arrangement; and a data acquisition system operably coupled to the plurality of drift tubes for collecting and processing data from the drift tubes.

19. The detection system of claim 18, wherein the detection gas comprises at least one of a noble gas or a quencher gas.

20. The detection system of claim 18, wherein: for each of at least one of the plurality of drift tubes, the first end cap of the drift tube comprises a first anode connector electrically connected to one of the two wire terminals of the drift tube; and the first anode connector of the drift tube is electrically isolated from the first end cap using an electrically insulating material.

* * * * *